Patented Oct. 27, 1931

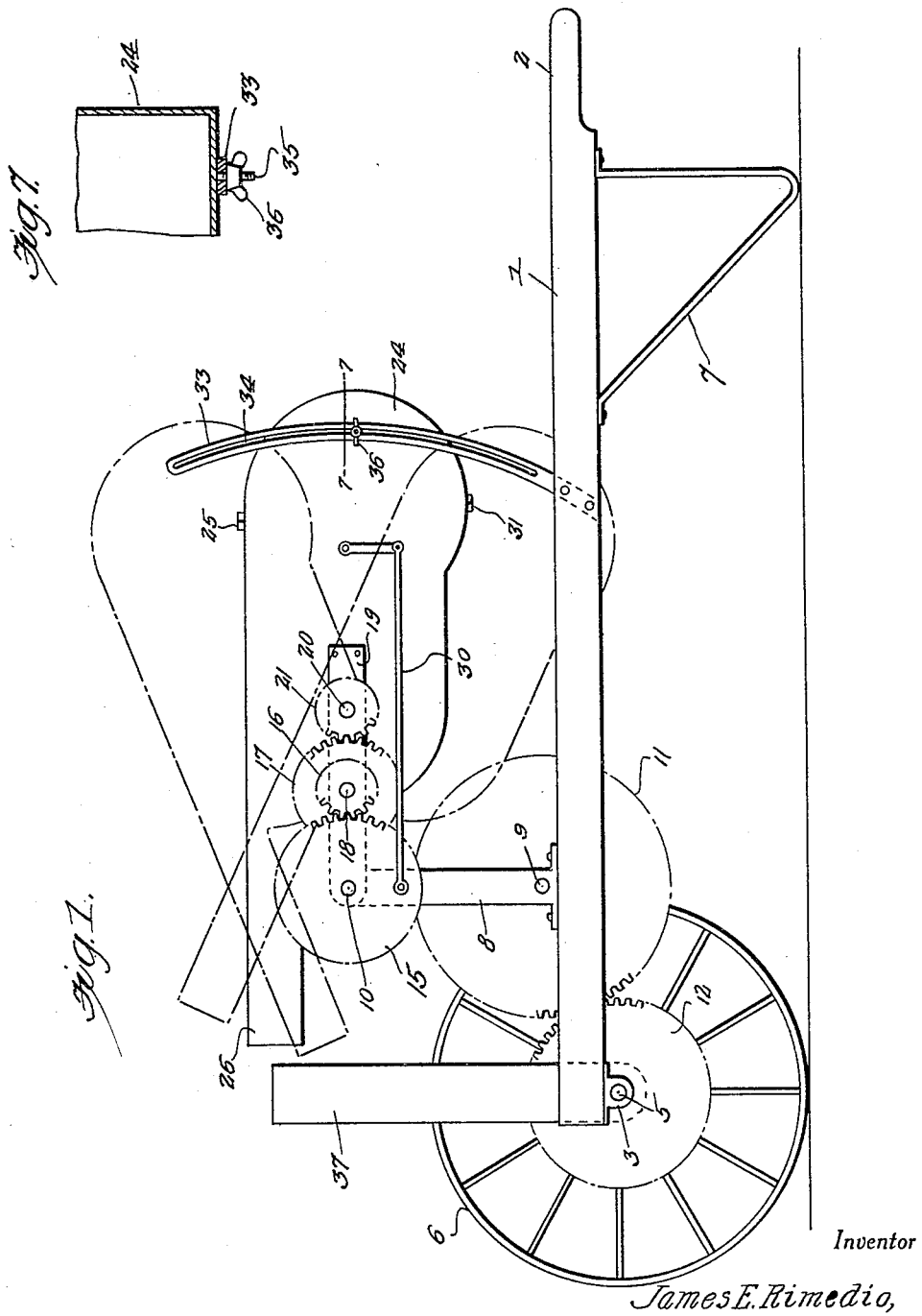

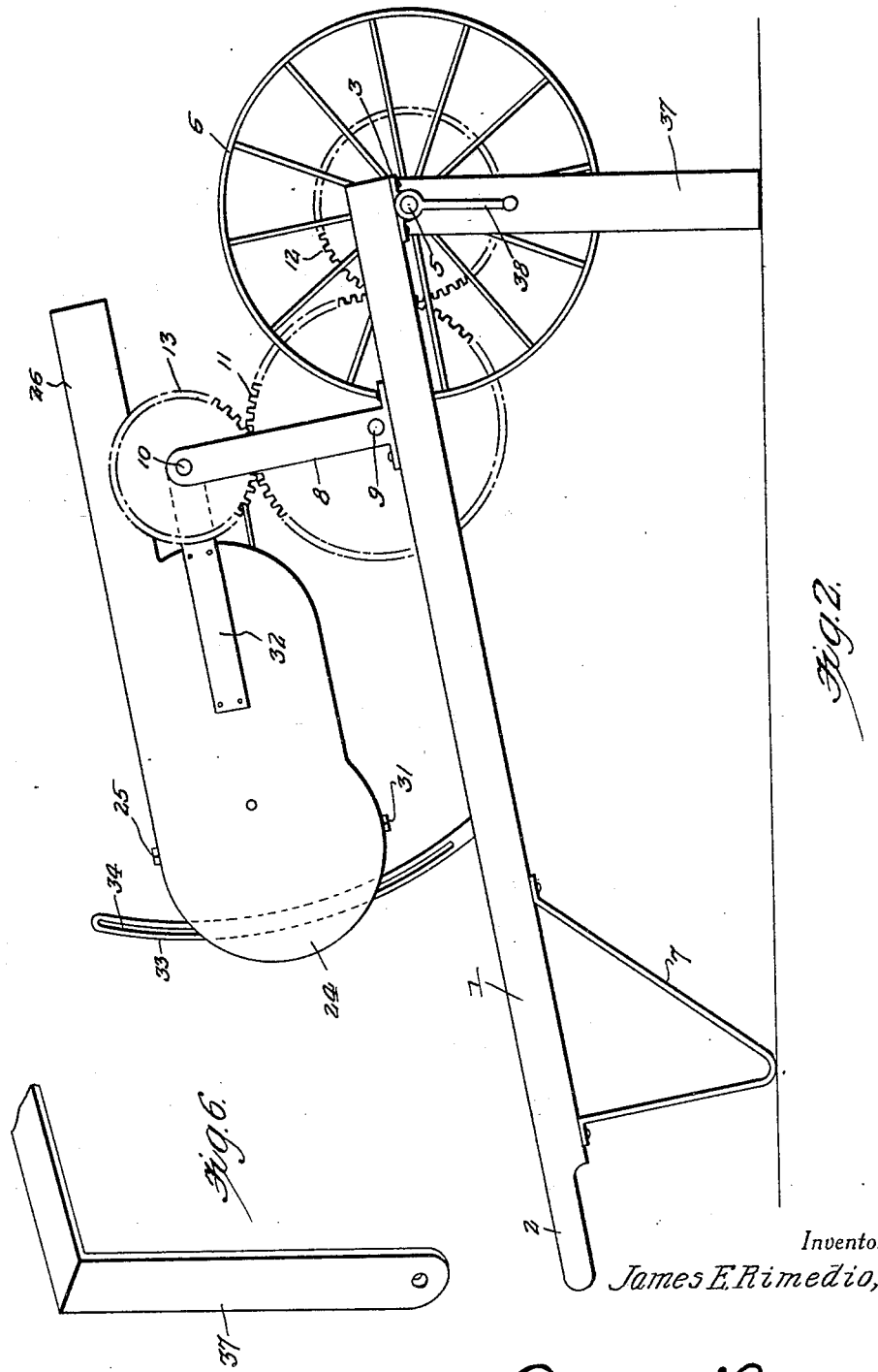

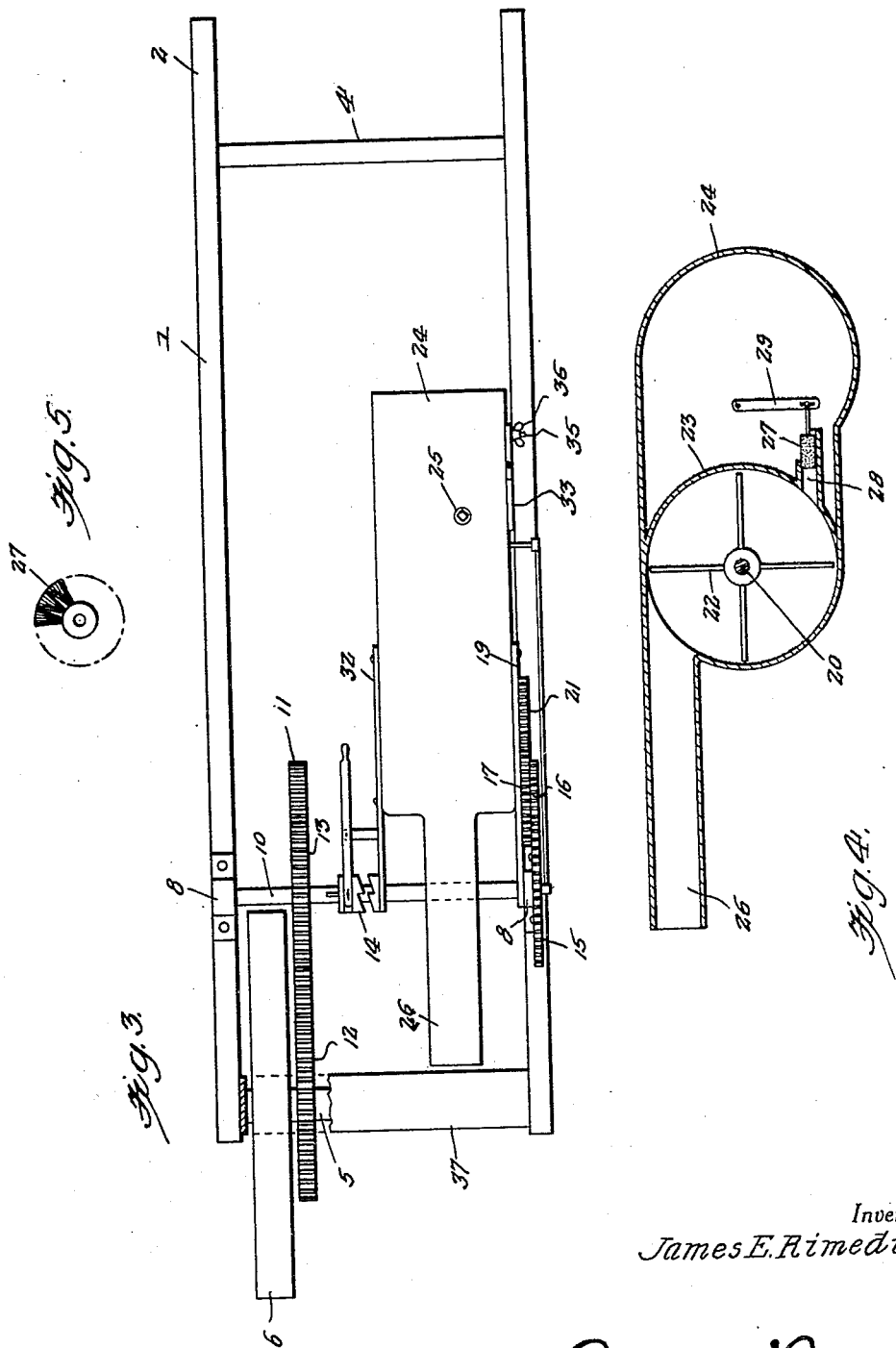

1,829,298

UNITED STATES PATENT OFFICE

JAMES E. RIMEDIO, OF DOVER, OHIO

PLANT SPRAYING APPARATUS

Application filed October 14, 1929. Serial No. 399,511.

This invention relates to a dusting machine for spraying bushes, rose arbors, small trees and plants with poisonous powder to rid the same of insects and vermin. It can also be used for spreading fertilizer in powdered form both in the garden and in the field.

One of the objects of the invention is to provide a dusting machine of the above character wherein the powdered material is sprayed from a blower which can be angularly adjusted to spray the material in accordance with the height of the particular plant, bush, or tree required to be treated.

A further object is to provide a manually propelled dusting apparatus in which the material is sprayed from the blower automatically when the apparatus is being propelled and manually when it is at a standstill.

A further object is to provide an apparatus for this purpose which is simple and efficient in operation, and which can be operated in a narrow row as well as in a wide row.

With the above and other objects in view, the invention consists in the novel construction, arrangement and combination of parts hereinafter more fully described with reference to the accompanying drawings, wherein:

Figure 1 is a side view of the device as it appears when manually propelled,

Figure 2 is a reverse side view of the device as it appears when operated at a standstill, Figure 3 is a top plan view of the device shown in Figure 1, Figure 4 is a longitudinal sectional view of the blower, Figure 5 is a detail view of the powder feeding brush.

Figure 6 is a detail view disclosing a portion of the spraying supporting prop, and Figure 7 is a sectional detailed view taken on line 7—7 of Figure 1.

This dusting machine consists of a wheeled trundle frame composed of two spaced parallel bars 1, each of which has a handle 2 at one end and an axle bearing 3 at the other end, the bars being connected adjacent the handles by a cross brace 4. Bearings 3 receive the axle 5 on which is mounted the ground wheel 6, and depending from the underside of the handle bars 1 are suitable ground engaging leg frames 7.

Each handle bar is further provided in proximity to its wheeled end with a vertical standard 8 and these standards support two vertically spaced cross shafts 9 and 10, upon the former or lower one of which is fixedly mounted the large drive gear 11 which is driven from the smaller axle gear 12.

The gear 11 drives a gear 13 which runs loose on shaft 10 but which may be coupled thereto by any conventional clutch means, such as indicated generally at 14. On the left hand side of shaft 10 and outside of the standard 8 is mounted a gear 15 which meshes with the pinion 16 of a drive gear 17 which rotates on a stub shaft 18 carried by the blower pivot arm 19, through which extends one end of the blower fan shaft 20 upon which is fixed the gear 21 which meshes with the gear 17. It will thus be obvious that when the device is manually propelled over a garden or field, the blower fan 22 carried by the fan shaft 20 will be rapidly revolved by the various intermeshing gears and castings just described.

The blower casing is formed rearwardly of the fan compartment 23 with an enlarged chamber 24 into which is deposited through the filling opening 25 a suitable supply of spray material, either of insect and vermin destroying powder or fertilizer in powdered form, according to the particular purpose for which the device is intended to be used.

Forwardly of the fan compartment and adjacent the outlet port thereof, the blower casing is formed with an elongated spout or spray nozzle 26 through which the powder is ejected. The powdered contents of the chamber 24 is fed to the blower casing by means of a reciprocating brush 27 which slides back and forth in the feed tube 28; the brush being operated through suitable crank connection 29 with a crank rod 30 operated by the gear 15. As shown the upper portion of the tube 28 adjacent to the rear end thereof is removed so as to permit the powder in the powder chamber to enter the tube in front of the brush 27 when said brush is in its rearmost position.

When desired, the powder chamber can be drained through the drain outlet 31. To provide for adjusting the blower angularly to various spraying positions, the blower casing is provided with a pair of forwardly extending arms 19 and 32 which are pivotally supported on the shaft 10 and one of the handle bars of the wheeled frame is provided with a vertically disposed arcuate guide 33 having a longitudinal slot 34 through which projects the guide pin 35 of the blower casing, which pin is provided with a thumb nut 36 for clamping the guide to hold the blower in the position to which it is adjusted.

By means of this arrangement the blower can be set at various angles for spraying the powder uniformly over the entire plant or bush, etc., and it is particularly efficacious in enabling the sprayed material to be projected under the leaves and to other remote parts of the plant.

When it is desired to spray the material within a restricted or limited area, without trundling or wheeling the apparatus about, the latter is brought to a standstill and the wheeled end of the frame is propped up as shown in Figure 2 by the prop frame 37 so that the wheel 6 is raised clear of the ground.

The axle 3 is then rotated by means of a hand crank 38 and the consequent rotation of the axle gear and the other intermeshing gears result in the operation of the blower mechanism. The prop frame 37 is pivotally supported on the axle and when the device is used as a trundle the prop frame is swung into vertical position above the handle bars so as to be out of the way.

Having thus described my invention, what I claim as new is:

1. In a plant spraying apparatus and in combination, a blower casing having eduction means, a chamber arranged adjacent said blower casing, a substantially horizontal tube disposed in said chamber for conducting substance to be sprayed from the chamber to the blower casing, the said tube communicating at its forward end with the interior of the blower casing and having its upper portion removed adjacent to its rear end a blower in the blower casing, reciprocatory means in said tube for forcing substance to be sprayed from said chamber into said blower casing, and means for simultaneously operating said blower and said reciprocatory means.

2. In a plant spraying apparatus and in combination, a blower casing having eduction means, a chamber arranged adjacent said blower casing, a substantially horizontal tube disposed in said chamber for conducting substance to be sprayed from the chamber to the blower casing, the said tube communicating at its lower end with the interior of the blower casing and having its upper portion removed adjacent to its rear end, a blower in the blower casing, reciprocatory means in said tube for forcing substance to be sprayed from said chamber into said blower casing, and means for simultaneously operating said blower and said reciprocatory means; the said reciprocatory means being in the form of a brush rectilinearly movable in the tube and beyond the open end thereof.

3. A plant spraying apparatus comprising a frame, a blower casing pivotally mounted on said frame for adjustment relatively to the same about said pivot to various spraying positions and having eduction means, a blower in said casing, and means interposed between and connected to the frame and said casing for adjustably fixing the casing relatively to the frame at various points about its center of movement.

4. In a plant spraying apparatus and in combination, a frame, an axle journaled in bearings on said frame, standards mounted on the frame, a transverse shaft mounted in said standards, bars pivotally connected to said shaft, a blower casing with eduction means fixedly connected to said bars and adjustable therewith about the center of said shaft and relatively to said frame, means for adjustably fixing said blower casing, a blower in the casing, and a driving connection intermediate of the axle and the blower for rotating the latter by the former.

In testimony whereof I affix my signature.

JAMES E. RIMEDIO.